(12) United States Patent
Martinez Romero et al.

(10) Patent No.: US 10,167,028 B2
(45) Date of Patent: Jan. 1, 2019

(54) SPARE TIRE PRESENTATION APPARATUS

(71) Applicant: FORD GLOBAL TECHNOLOGIES, LLC, Dearborn, MI (US)

(72) Inventors: Diego Clemente Martinez Romero, Puebla (MX); Jose Antonio Segura Salgado, Puebla (MX); Francisco Jose Fernandez Sanchez, Puebla (MX)

(73) Assignee: Ford Global Technologies, LLC, Dearborn, MI (US)

( * ) Notice: Subject to any disclaimer, the term of this patent is extended or adjusted under 35 U.S.C. 154(b) by 17 days.

(21) Appl. No.: 15/283,983

(22) Filed: Oct. 3, 2016

(65) Prior Publication Data

US 2018/0093722 A1 Apr. 5, 2018

(51) Int. Cl.
*B62D 43/10* (2006.01)
*B62D 43/00* (2006.01)

(52) U.S. Cl.
CPC ............ *B62D 43/10* (2013.01); *B62D 43/002* (2013.01)

(58) Field of Classification Search
CPC ...... B62D 43/10; B62D 43/002; B62D 43/00; B62D 43/06
USPC .......... 224/42.12, 42.21; 414/463, 465, 466; 296/37.2
See application file for complete search history.

(56) References Cited

U.S. PATENT DOCUMENTS

| | | | | |
|---|---|---|---|---|
| 2,091,069 A * | 8/1937 | Girl | ........................... | B60R 5/04 224/42.32 |
| 2,547,083 A | 4/1951 | Lundgren | | |
| 3,559,829 A * | 2/1971 | Shamel | .................. | B62D 43/10 224/42.21 |
| 3,940,041 A * | 2/1976 | Bott | ........................ | B62D 43/10 224/42.12 |
| 4,230,246 A * | 10/1980 | Wilson | .................. | B62D 43/10 224/42.13 |
| 4,278,191 A | 7/1981 | Mecham | | |
| 4,455,948 A * | 6/1984 | Torres | .................... | A47B 31/06 108/138 |
| 4,573,855 A * | 3/1986 | Braswell | ................ | B62D 43/04 224/42.23 |
| 4,676,415 A | 6/1987 | Kennedy | | |
| 4,795,302 A * | 1/1989 | Dalton | .................. | B62D 43/04 224/42.23 |
| 4,799,849 A * | 1/1989 | Miller | ...................... | B60R 5/04 296/37.1 |

(Continued)

FOREIGN PATENT DOCUMENTS

| | | |
|---|---|---|
| CN | 105151137 A | 12/2015 |
| DE | 102013010282 A1 | 12/2014 |

(Continued)

OTHER PUBLICATIONS

English Machine Translation of FR3032413A1.

(Continued)

*Primary Examiner* — Justin Larson
(74) *Attorney, Agent, or Firm* — Vichit Chea; King & Schickli, PLLC

(57) ABSTRACT

A spare tire presentation apparatus includes a base, a four bar linkage and a sliding platform. The four bar linkage connects the base to the motor vehicle. The sliding platform is supported on the base. A spare tire is carried on the sliding platform.

19 Claims, 5 Drawing Sheets

(56) References Cited

U.S. PATENT DOCUMENTS

| | | | |
|---|---|---|---|
| 4,941,797 A * | 7/1990 | Smillie, III | B60R 5/04 |
| | | | 187/269 |
| 5,022,573 A | 6/1991 | Barkouskie | |
| 5,228,661 A | 7/1993 | Bigham et al. | |
| 5,238,358 A | 8/1993 | Higgins et al. | |
| 5,860,786 A | 1/1999 | Aubrecht | |
| 5,951,232 A * | 9/1999 | Yu | B62D 43/10 |
| | | | 224/42.21 |
| 5,993,133 A * | 11/1999 | Murray | B62D 43/045 |
| | | | 224/42.12 |
| 6,053,690 A * | 4/2000 | Hanson | B62D 43/04 |
| | | | 224/42.21 |
| 6,516,983 B2 * | 2/2003 | Sotiroff | B60J 5/047 |
| | | | 224/281 |
| 7,900,989 B2 * | 3/2011 | Edwards | B60R 11/00 |
| | | | 224/42.12 |
| 9,771,111 B2 * | 9/2017 | Gonalez Valdes | B62D 43/10 |
| 2010/0119342 A1 * | 5/2010 | Russ | B62D 43/045 |
| | | | 414/463 |

FOREIGN PATENT DOCUMENTS

| | | |
|---|---|---|
| FR | 3032413 A1 | 8/2016 |
| KR | 19980009018 A | 4/1998 |
| KR | 20020086082 A | 11/2002 |
| KR | 20050061720 A | 6/2005 |
| KR | 20060002217 A | 1/2006 |
| WO | 0030917 A1 | 6/2000 |

OTHER PUBLICATIONS

English Machine Translation of CN105151137A.
English Machine Translation of DE102013010282A1.
English Machine Translation of KR19980009018A.
English Machine Translation of KR20020086082A.
English Machine Translation of KR20050061720A.
English Machine Translation of KR20060002217A.
English Machine Translation of WO0030917A1.

* cited by examiner

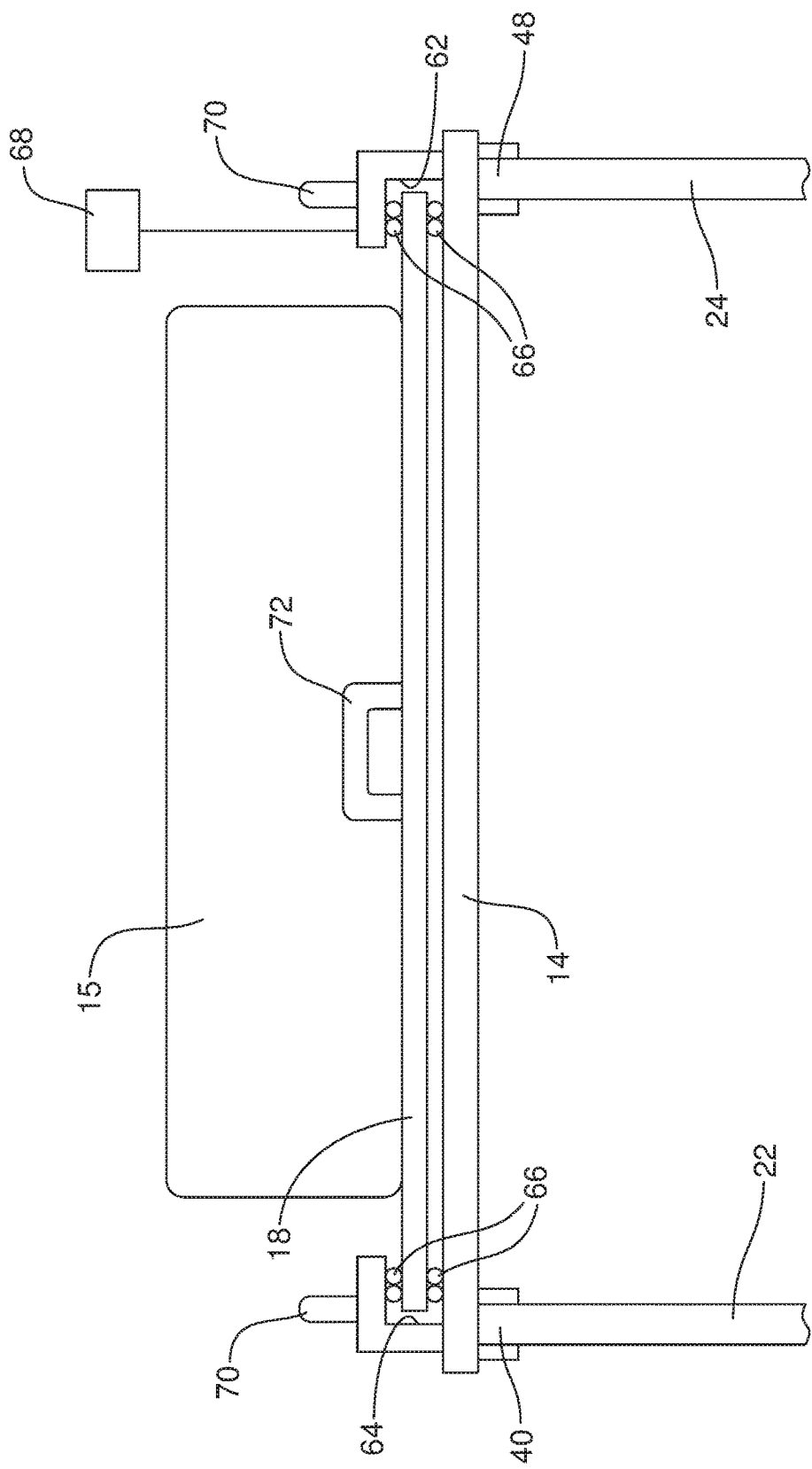

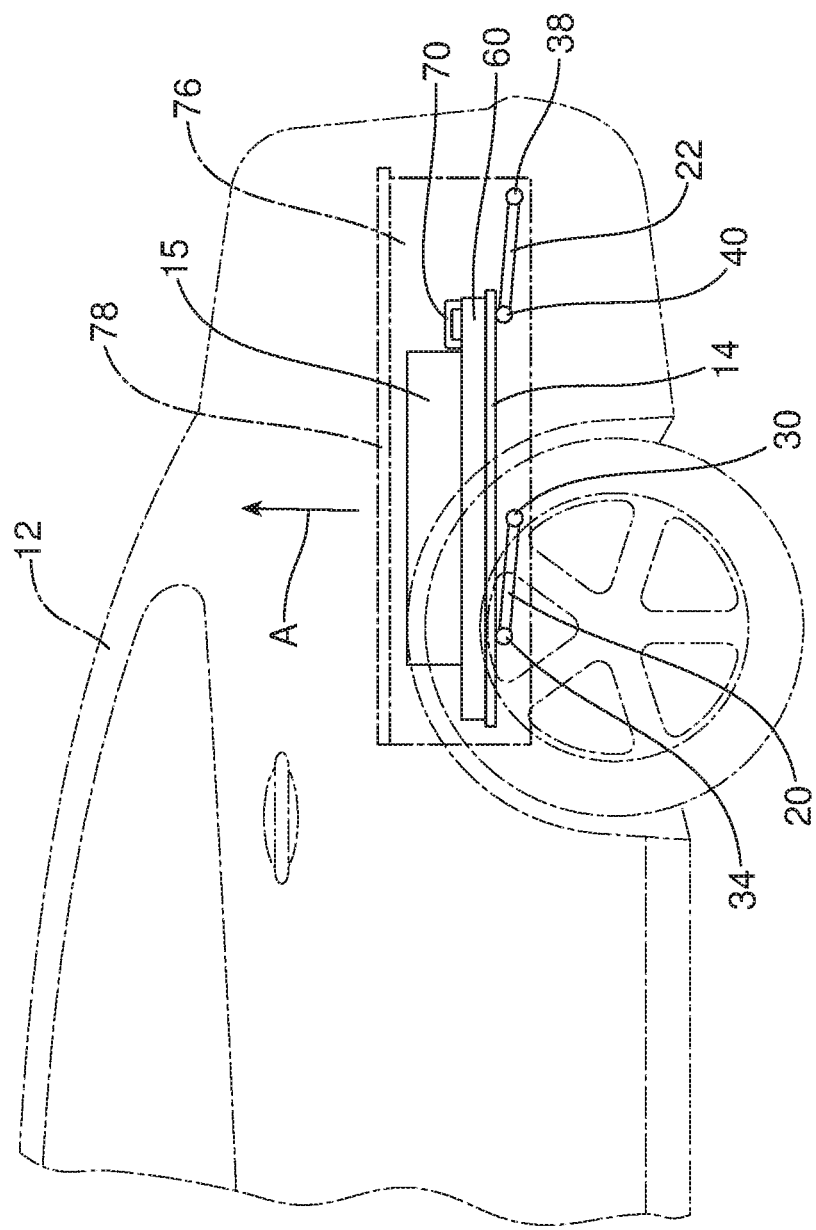

SPARE TIRE PRESENTATION APPARATUS

TECHNICAL FIELD

This document relates generally to the motor vehicle equipment field and, more particularly, to a spare tire presentation apparatus that makes it easier to access and utilize a spare tire.

BACKGROUND

A motor vehicle typically includes a spare tire which may be utilized to replace a flat tire if one is encountered during motor vehicle operation. It is not uncommon for the spare tire to be stowed within a recess of the floor of the motor vehicle under a carpeted cover.

A spare tire includes not only the tire but the wheel to which the tire is connected. A full size spare tire may weigh as much as 20 to 25 pounds. As a result of the relatively inaccessible position in which the spare tire is stowed and the significant weight of the spare tire, it can be very difficult to access and remove the spare tire for use. This is particularly true for those who are smaller in stature, weak with age or suffer from some disability.

This document relates to a new and improved spare tire presentation apparatus that is ergonomically friendly. The apparatus allows the spare tire to be more easily removed and pivoted from the stowed position in the floor recess and then shifted rearward through a closure opening and beyond the rear fascia of the motor vehicle where the spare tire is far more easily accessed and used in a simple and efficient manner.

SUMMARY

In accordance with the purposes and benefits described herein, a spare tire presentation apparatus is provided. That spare tire presentation apparatus comprises a base, a four bar linkage connecting the base to the motor vehicle and a sliding platform supported on the base. A spare tire is carried on the sliding platform.

The four bar linkage includes a first bar, a second bar, a third bar and a fourth bar. The first bar includes a first end connected by a first pivot to the motor vehicle and a second end connected by a second pivot to the base. The second bar includes a third end connected by a third pivot to the motor vehicle and a fourth end connected by a fourth pivot to the base. The third bar includes a fifth end connected by a fifth pivot to the motor vehicle and a sixth end connected by a sixth pivot to the base. The fourth bar includes a seventh end connected by a seventh pivot to the motor vehicle and an eighth end connected by an eighth pivot to the base.

The apparatus may further include a guide track carried on the base. The sliding platform engages the guide track so as to be displaceable between a retracted position and an extended position. The guide track may include a first guide channel and a second guide channel. Further, the spare tire presentation apparatus may include a roller bearing assembly between the sliding platform and the guide track. Such a roller bearing assembly will allow for smooth sliding action of the sliding platform when that platform is displaced between positions.

In addition, the spare tire presentation apparatus may include a first handhold connected to the base. That handhold may be utilized to displace the base from the stowed position where the spare tire is held in the floor recess to a raised or deployed position where the spare tire is lifted completely out of the recess.

In addition, the spare tire presentation apparatus may include a second handhold connected to the sliding platform. That second handhold may be utilized to displace the sliding platform from the retracted or forward position overlying the base to the extended or most rearward position wherein at least a portion of the spare tire is positioned rearward of the rear fascia of the motor vehicle where the spare tire may be better accessed for use.

In accordance with an additional aspect, a method is provided of presenting a spare tire for use. That method may be described as comprising the steps of: (a) displacing a base from a stowed position to a deployed position by means of a four bar linkage and (b) displacing a sliding platform carried on the base from a retracted position to an extended position whereby a spare tire carried on the sliding platform is positioned for better access and use.

The method may also include the step of raising a cover overlying the spare tire before displacing the base. Further, the method may include the step of pivoting the base upward from the stowed position within a recess in the floor of the motor vehicle. In addition, the method may include positioning at least a portion of the spare tire rearward of a rear fascia of the motor vehicle when the sliding platform is in the extended position.

In the following description, there are shown and described several preferred embodiments of the spare tire presentation apparatus. As it should be realized, the spare tire presentation apparatus is capable of other, different embodiments and its several details are capable of modification in various, obvious aspects all without departing from the spare tire presentation apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spare tire presentation apparatus and together with the description serve to explain certain principles thereof. In the drawing figures:

FIG. 2 is a detailed schematic elevational view of the apparatus illustrating the base and the sliding platform carried on the base as well as the guide track for that platform.

FIGS. 3a-3c is a series of schematic side elevational views illustrating the operation of the spare tire presentation apparatus illustrated in FIGS. 1 and 2.

FIG. 3a illustrates the spare tire presentation apparatus in the home position wherein the spare tire is held within a recess in the floor of the motor vehicle.

FIG. 3b illustrates the spare tire presentation apparatus in an intermediate position wherein the base has been pivoted upward to displace or lift the spare tire above the recess in the motor vehicle floor.

FIG. 3c illustrates the apparatus in the fully deployed position wherein the spare tire is presented for use in an easily reached position rearward of the rear fascia of the motor vehicle.

Reference will now be made in detail to the present preferred embodiments of the spare tire presentation apparatus, an example which is illustrated in the accompanying drawing figures.

DETAILED DESCRIPTION

Figure 1:
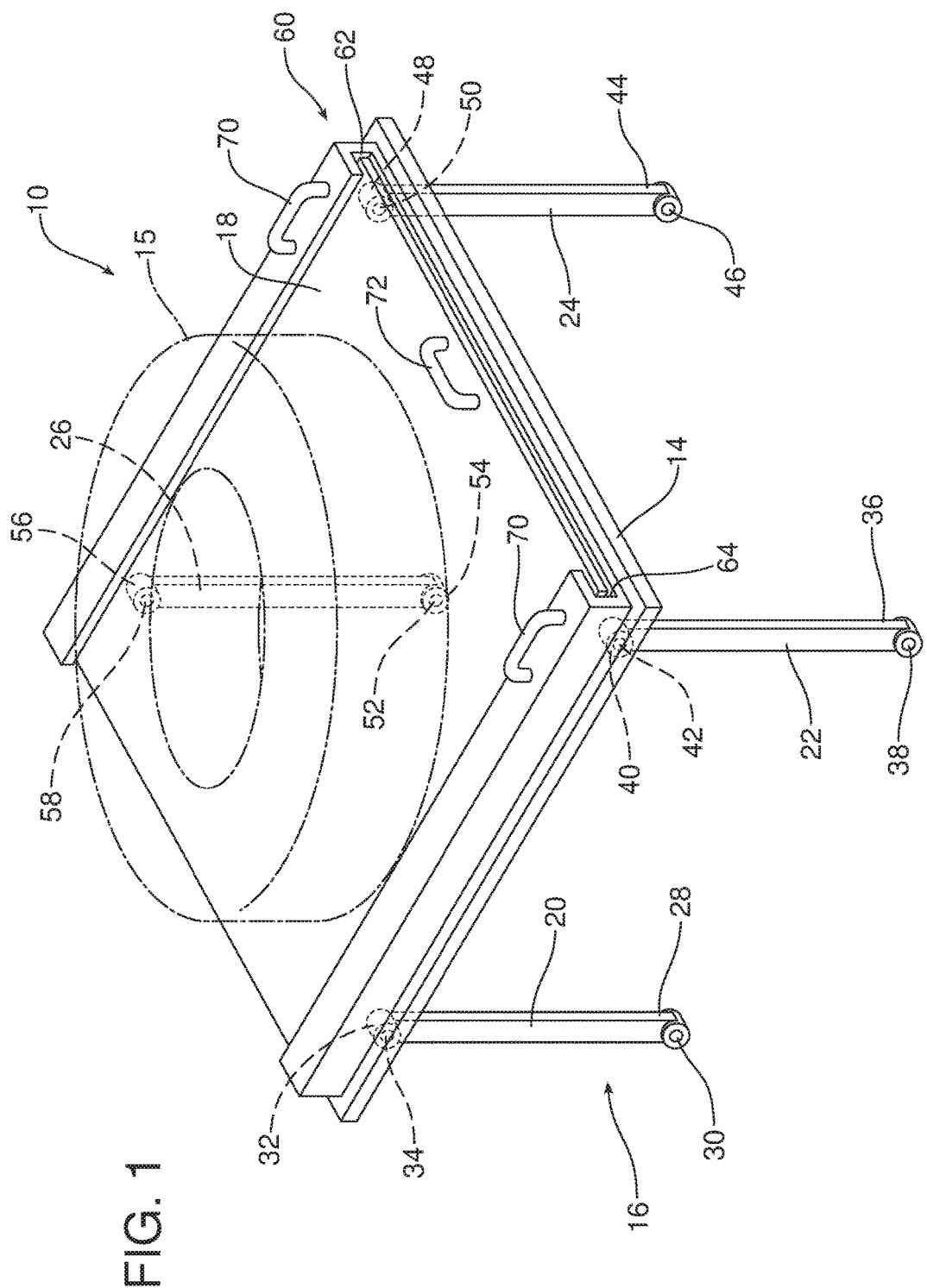
FIG. 1 is a perspective view of the spare tire presentation apparatus.
Figure 3B:
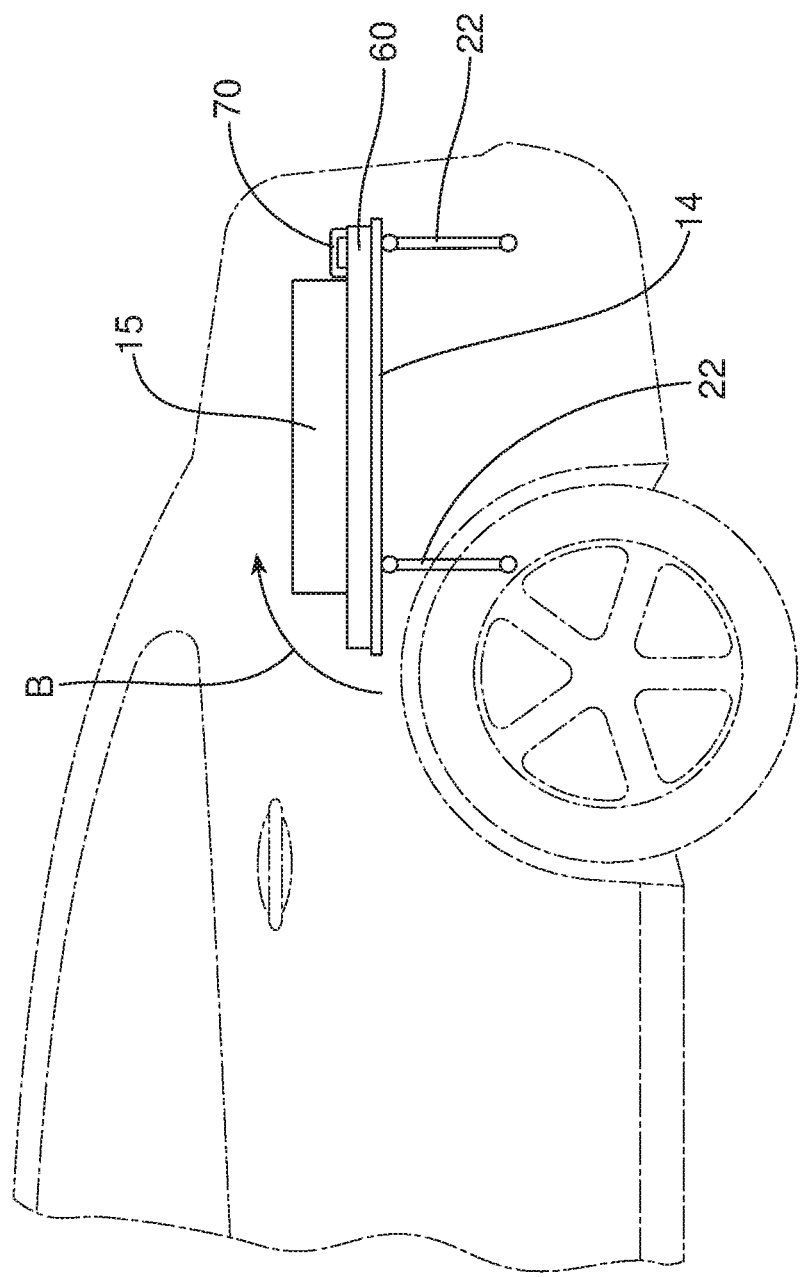
Figure 3C:
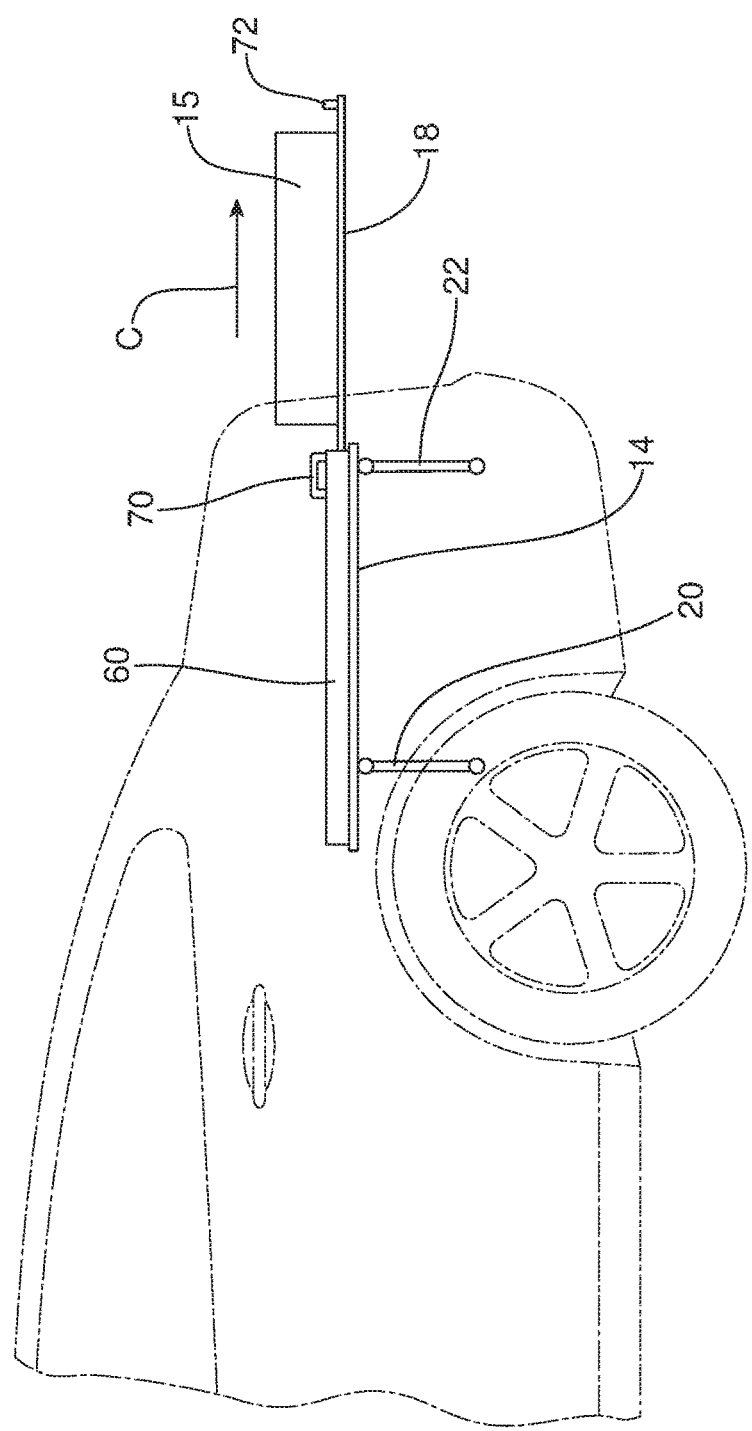

Reference is now made to FIGS. 1 and 2 which illustrate the spare tire presentation apparatus 10 as well as FIGS. 3a-3c which illustrate the operation of that apparatus with respect to the motor vehicle 12.

As best illustrated in FIGS. 1 and 2, the spare tire presentation apparatus 10 includes a base 14, a four bar linkage 16 for connecting the base to the motor vehicle 12 and a sliding platform 18 supported on the base. A spare tire 15 is carried on the sliding platform 18.

More specifically, the four bar linkage 16 includes a first bar 20, a second bar 22, a third bar 24 and a fourth bar 26. The first bar 20 includes a first end 28 connected by a first pivot 30 to the motor vehicle 12 and a second end 32 connected by a second pivot 34 to the base 14 adjacent a first corner thereof.

The second bar 22 includes a third end 36 connected by a third pivot 38 to the motor vehicle 12 and a fourth end 40 connected by a fourth pivot 42 to the base 14.

The third bar 24 includes a fifth end 44 connected by a fifth pivot 46 to the motor vehicle 12 and a sixth end 48 connected by a sixth pivot 50 to the base 14.

The fourth bar 26 includes a seventh end 52 connected by a seventh pivot 54 to the motor vehicle 12 and an eighth end 56 connected by an eighth pivot 58 to the base 14 adjacent a fourth corner thereof.

As shown in FIGS. 1 and 2, a guide track, generally designated reference numeral 60, is carried on the base 14. More specifically, the guide track 60 includes a first guide channel 62 and a second guide channel 64. The sliding platform 18 engages the guide track 60 and more specifically the opposed first guide channel 62 and second guide channel 64 so as to be displaceable between a retracted position and an extended position as will be described in greater detail below. A roller bearing assembly 66 may be provided to ensure smooth, easy sliding movement of the sliding platform 18 along the guide track 60. A lock mechanism, schematically illustrated at 68, may be provided to lock the sliding platform 18 in the fully retracted position.

A first handhold 70 is connected to the base 14 and a second handhold 72 is connected to the sliding platform. In the illustrated embodiment, the first handhold 70 comprises two handles outboard of the sliding platform 18. The second handhold 72 comprises a single handle at the rearmost center of the sliding platform 18.

Reference is now made to FIGS. 3a-3c illustrating the operation of the spare tire presentation apparatus 10. FIG. 3a illustrates the spare tire presentation apparatus 10 in the fully stowed position. In this position, the spare tire 15 carried on the sliding platform 18 is held in a recess 76 beneath a cover 78 that forms part of a floor of the motor vehicle. When the spare tire 15 is in the stowed position illustrated in FIG. 1, the base 14 is in a lowered or stowed position and the sliding platform 18 is in the retracted or most forward position.

When one wishes to access the spare tire 15, one first raises the cover 78 as shown by action arrow A in FIG. 3a and then pivots the base 14 upward into an intermediate presentation position as illustrated by action arrows B in FIG. 3b. This may be done by grasping the first handhold 70 connected to the base 14 and pulling motor vehicle rearward. Advantageously, the four bar linkage 16 reduces the force required to raise the spare tire 15 out of the recess 76 into the intermediate position illustrated in FIG. 3b.

Next, the operator disengages the lock mechanism 68 by, for example, pushing a button (not shown) on the second handhold 72 and then utilizes that handhold to pull or displace the sliding platform 18 rearward in the direction of action arrow C from the retracted position illustrated in FIG. 3b to the fully extended position illustrated in FIG. 3c. The bearing assembly 66 provided between the sliding platform 18 and the guide track 60 fixed to the base 14 ensures smooth sliding movement of the sliding platform. When fully deployed as illustrated in FIG. 3c, a portion or as much as all of the spare tire 15 extends rearwardly from the rear fascia 80 of the motor vehicle 12 where the spare tire may be easily accessed. In fact, the operator need only slide the spare tire 15 off either side of the sliding platform 18: no lifting is necessary.

Consistent with the above description, a method is provided of presenting a spare tire 15 for use. That method includes the steps of displacing a base 14 from a stowed position to a deployed position by means of a four bar linkage 16 (see FIGS. 3a and 3b). Further the method includes the step of displacing a sliding platform 18 from a retracted position to an extended position so that the spare tire 15 carried on the sliding platform is positioned for better access and use (see FIGS. 3b and 3c).

As should be appreciated the method may further include the step of raising a cover 78 overlying the spare tire 15 before displacing the base 14 (See FIG. 3a and note action arrow A.) In the illustrated embodiment, that cover 78 is lifted upward and removed. In other embodiments, the cover 78 may be simply pivoted upward.

As should further be appreciated from reviewing FIGS. 3a and 3b, the illustrated method includes pivoting the base 14 upward from the stowed position within the recess 76 in the floor of the motor vehicle 12 by means of the four bar linkage 16. Further, the method may include the step of positioning at least a portion of the spare tire 74 rearward of a rear fascia 80 of the motor vehicle 12 when the sliding platform 18 is in the extended or most rear position.

The foregoing has been presented for purposes of illustration and description. It is not intended to be exhaustive or to limit the embodiments to the precise form disclosed. Obvious modifications and variations are possible in light of the above teachings. For example, the illustrated embodiment includes a bearing assembly 66 between the sliding platform 18 and the guide track 60 to provide for smooth sliding movement of the sliding platform 18 with respect to the base 14. In other embodiments, the interface between the sliding platform 18 and the guide track 60 may simply be made from low friction materials that aid in producing the desired free sliding motion. All such modifications and variations are within the scope of the appended claims when interpreted in accordance with the breadth to which they are fairly, legally and equitably entitled.

What is claimed:

1. A spare tire presentation apparatus for a motor vehicle, comprising:
    a base;
    a four bar linkage connecting said base to the motor vehicle, said four bar linkage including a first bar, a second bar, a third bar and a fourth bar wherein all four bars are unconnected from one another; and
    a sliding platform supported on said base.

2. The spare tire presentation apparatus of claim 1, further including a spare tire carried on said sliding platform.

3. The spare tire presentation apparatus of claim 2, wherein said first bar includes a first end connected by a first pivot to the motor vehicle and a second end connected by a second pivot to said base.

4. The spare tire presentation apparatus of claim 3, wherein said second bar includes a third end connected by a third pivot to the motor vehicle and a fourth end connected by a fourth pivot to said base.

5. The spare tire presentation apparatus of claim 4, wherein said third bar includes a fifth end connected by a fifth pivot to the motor vehicle and a sixth end connected by a sixth pivot to said base.

6. The spare tire presentation apparatus of claim 5, wherein said fourth bar includes a seventh end connected by a seventh pivot to the motor vehicle and an eighth end connected by an eighth pivot to said base.

7. The spare tire presentation apparatus of claim 6, further including a guide track carried on said base, said sliding platform engaging said guide track so as to be displaceable between a retracted position and an extended position.

8. The spare tire presentation apparatus of claim 7, wherein said guide track includes a first guide channel and a second guide channel.

9. The spare tire presentation apparatus of claim 8, further including a roller bearing assembly between said sliding platform and said guide track.

10. The spare tire presentation apparatus of claim 9, including a first handhold connected to said base.

11. The spare tire presentation apparatus of claim 10, including a second handhold connected to said sliding platform.

12. The spare tire presentation apparatus of claim 2, further including a guide track carried on said base, said sliding platform engaging said guide track so as to be displaceable between a retracted position and an extended position.

13. The spare tire presentation apparatus of claim 12, wherein said guide track includes a first guide channel and a second guide channel.

14. The spare tire presentation apparatus of claim 13, including a roller bearing assembly between said sliding platform and said guide track.

15. The spare tire presentation apparatus of claim 2, further including a first handhold on said base and a second handhold on said sliding platform.

16. A method of presenting a spare tire for use, comprising:
   displacing a base from a stowed position to a deployed position by means of a four bar linkage having four unconnected bars; and
   displacing a sliding platform carried on said base from a retracted position to an extended position whereby the spare tire carried on said sliding platform is positioned for better access and use.

17. The method of claim 16, including raising a cover overlying said spare tire before displacing said base.

18. The method of claim 17, including pivoting said base upward from said stowed position within a recess of a floor of a motor vehicle.

19. The method of claim 18, including positioning at least a portion of said spare tire rearward of a rear fascia of said motor vehicle when said sliding platform is in said extended position.

* * * * *